(12) United States Patent
Hrabosky (10) Patent No.: US 8,296,235 B2
(45) Date of Patent: Oct. 23, 2012

(54) SYSTEM AND METHOD FOR CASHBACK FUNDING

(75) Inventor: Lisa Hrabosky, San Jose, CA (US)

(73) Assignee: eBay Inc., San Jose, CA (US)

( * ) Notice: Subject to any disclaimer, the term of this patent is extended or adjusted under 35 U.S.C. 154(b) by 193 days.

(21) Appl. No.: 11/964,911

(22) Filed: Dec. 27, 2007

(65) Prior Publication Data

US 2009/0070265 A1    Mar. 12, 2009

Related U.S. Application Data

(60) Provisional application No. 60/970,824, filed on Sep. 7, 2007.

(51) Int. Cl.
*G06Q 40/00* (2006.01)

(52) U.S. Cl. ............................................ 705/44; 705/41

(58) Field of Classification Search .................... 705/44, 705/41
See application file for complete search history.

(56) References Cited

U.S. PATENT DOCUMENTS

2006/0253392 A1* 11/2006 Davies ............................ 705/40
2007/0175982 A1*  8/2007 Bonalle et al. ................ 235/380

OTHER PUBLICATIONS

Where to get a mortgage . . . homes faster.; The Spectator. Hamilton, Ont. : Jun. 20, 1998. p. BH.07.*
First-time buyers . . . Seris: BUYERS' SCHOOL: Wendell Hutsin. Chicago Sun-Times. Chicago, ILL.: Jun. 20, 2004.*
To succeed in BPO: Have answers to all the 'what ifs'; Businessline. Chennai: May 7, 2004. p. 1.*

* cited by examiner

*Primary Examiner* — Hani M Kazimi
*Assistant Examiner* — Hatem M Ali
(74) *Attorney, Agent, or Firm* — Schwegman Lundberg & Woessner, P.A.

(57) ABSTRACT

In an example embodiment, a system is provided for a cashback funding of an account. The system comprises a transaction receiving module to receive a request to process a transaction amount, wherein the transaction amount is funded by a debit card. The system further comprises a transaction authorization module to make a pre-authorization request to the debit card, wherein the pre-authorization request exceeds the transaction amount by a predetermined value and is to receive an approval for the pre-authorization request. The system further comprises a cashback funding module to offer a cashback amount in excess of the transaction amount but less than the predetermined value. In response to an acceptance of the cashback offer by a user, the cashback funding module is to make an authorization request for the total amount, and in response to an approval of the authorization, is to fund the account with the funds in excess of the transaction.

8 Claims, 5 Drawing Sheets

SYSTEM AND METHOD FOR CASHBACK FUNDING

RELATED APPLICATION

This non-provisional patent application claims the benefit of the filing date of U.S. Provisional Patent Application Ser. No. 60/970,824; filed Sep. 7, 2007; and entitled, "SYSTEM AND METHOD FOR A CASHBACK FUNDING OF AN E-COMMERCE ACCOUNT", the content of which is incorporated by reference herein.

FIELD

The present disclosure relates generally to computer software. In an example embodiment, the disclosure relates to a system and method for cashback funding.

BACKGROUND

Cashback from a debit card transaction is a service offered to users whereby an extra amount of value is added to the total amount to be paid using a debit card, and the user then receives the extra amount in the form of cashback along with their goods or services. Users may find the cashback from a debit card transaction a more convenient way to obtain cash than making a separate cash withdrawal transaction or transfer. The service may be offered by banks, merchants, service providers, money transmitters, and value transfer providers.

BRIEF DESCRIPTION OF DRAWINGS

The present disclosure is illustrated by way of example and not limited by the figures of the accompanying drawings, in which like references indicate similar elements and in which.

DESCRIPTION

In the following description, for purposes of explanation, numerous specific details are set forth in order to provide a thorough understanding of an example embodiment of the present disclosure. It will be evident, however, to one skilled in the art that the present disclosure may be practiced without these specific details.

Example embodiments for a computer implemented system and method for a cashback funding of an account are provided. In an example embodiment, when a transaction amount is funded by a debit card, a request to process a transaction amount may be received with the request. A pre-authorization request that exceeds the transaction amount by a predetermined value may be made to the debit card. If the pre-authorization request is approved, a cashback amount in excess of the transaction amount but less than the predetermined value may be offered to be deposited into an account. In response to an acceptance of a cashback offer, an authorization request for the total amount may be made and upon an approval of the authorization, the account may be funded with the cash in excess of the transaction amount. In some example embodiments, no request for a pre-authorization may be made and, instead, a user may be given options to fund an account with cash in excess of the transaction amount. Upon selecting a cashback option, a request for the authorization of the total amount (e.g. transaction amount and cashback amount) may be made and the account may be funded with funds in excess of the transaction amount.

The example embodiments described herein may be implemented in an operating environment comprising software installed on a computer, in hardware, in a combination of software and hardware, via a mobile telephone, or PDA (Personal Digital Assistant). A method and system for a cashback funding of an account are described.

Figure 1:
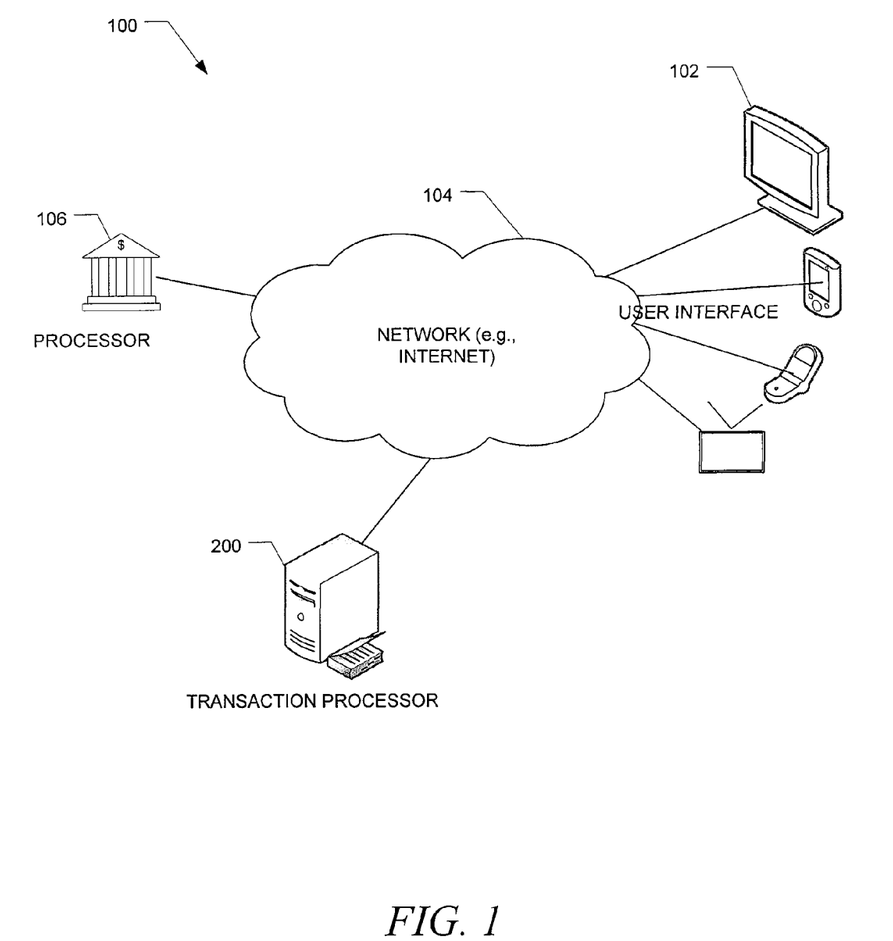
FIG. 1 is a diagram of an example embodiment of a networked system.

FIG. 1 is a diagram of a networked system, in accordance with an example embodiment. As shown in FIG. 1, a transaction processor 200, which is described in more detail below, may be configured to communicate with a user interface 102 and a third-party processor 106 via a network 104. The network environment 100, in the example embodiment, comprises the network 104, which may be a public network (e.g., the Internet, a wireless network, etc.) or a private network (e.g., local area network (LAN), wide area network (WAN), Intranet, etc). The network 104 may be a network of data processing nodes that are interconnected for the purpose of data communication.

Figure 2:
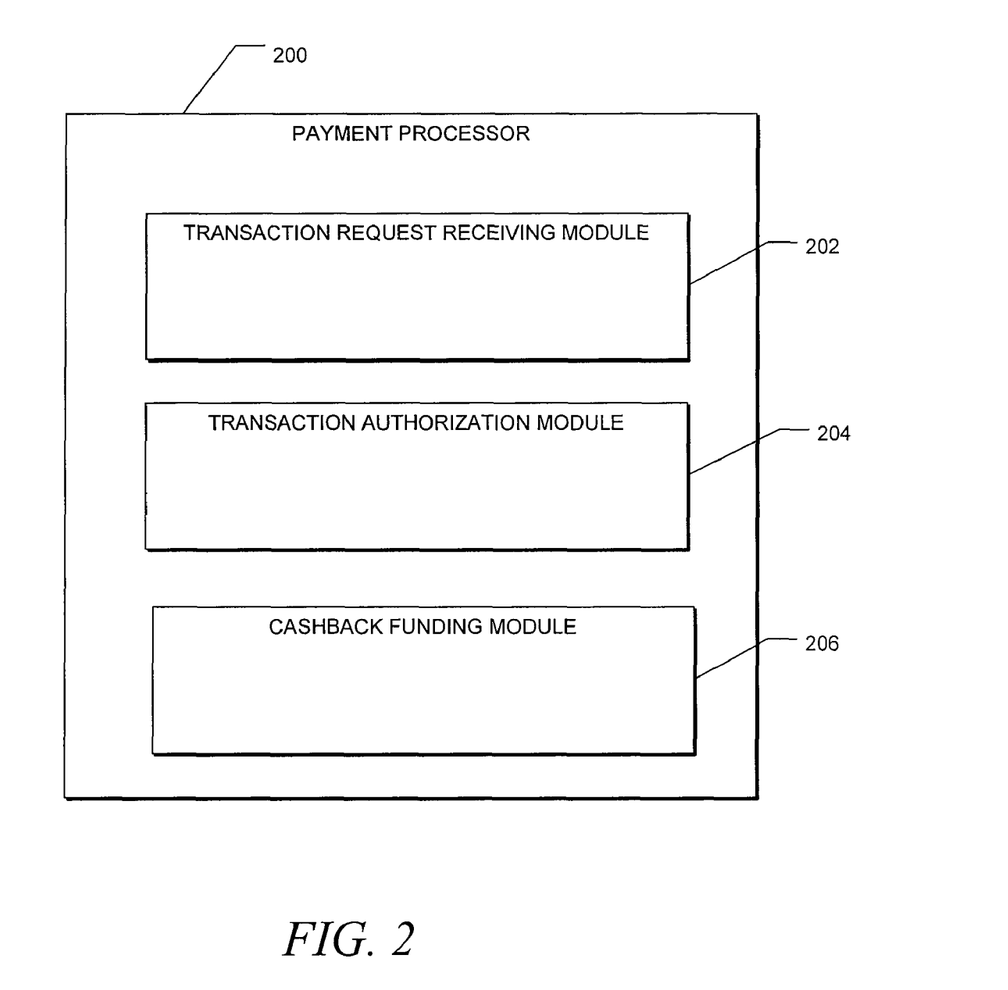
FIG. 2 is a simplified block diagram of an example embodiment of modules that may be included in an transaction processor.

FIG. 2 is a simplified block diagram of an example embodiment of modules that may be included in transaction processor 200 that are configured to process transactions. The transaction processor 200 is shown to include several example modules that may be configured to perform various operations that facilitate processing of transactions. In some example embodiments, the transaction processor 200 may include a transaction request receiving module 202, a transaction authorization module 204, and a cashback funding module 206.

Debit card cashback is a service that may be offered to users whereby an extra amount of value is added to the total amount of a transaction being paid for by a debit card. The user receives the extra amount in cash along with their goods or services. For example, a user may acquire $20 worth of goods or services and might ask for another $20 in cashback. If the total $40 amount is authorized, the payment provider may collect a total of $40 with the user's debit card and settle the requested $20 cashback amount to their designated account for future use along with their $20 worth of goods or services. Many users find this a useful way to obtain cash in their online account because they don't need to make a separate cash-only transaction. A program may offer a user a cashback amount by displaying an option to accept a certain amount in excess of the amount owned for goods or service.

The present application describes how such a cashback service may be offered by a transaction processing service. In the context of a transaction, merchants may only have to transfer a fixed commission fee (as opposed to a percentage of the transaction) to a bank when accepting transaction by a debit card. The fixed commission fee eliminates both percentage of transaction costs and some additional cost that are incurred when a total is above a certain fixed amount.

The transaction amount may represent a monetary amount of a financial transfer of two or more organizations or individuals that engage in acquiring and exchanging of products or services over electronic systems, such as the Internet and other computer networks. The preauthorization request is a non-posted pre-approval request for a future transaction followed within a specific time interval. Pre-authorization requests are used primarily in POS (Point of Sale) situations where the merchant wishes to obtain advance approval or verification that sufficient funds are available to a cardholder prior to submitting the transaction for settlement. In most cases the issuer will provide an authorization approval then place a temporary hold on the dollar amount of the pre-authorization pending receipt of the completion message or until a specific period of time. The account is a monetary account allowing the owner to engage in acquiring and exchanging of products or services over electronic systems, such as the Internet and other computer networks.

Online debit cards may require electronic authorization of every transaction and these transactions may be reflected in the user's account immediately. The transaction may be further secured with or without a PIN (Personal Identification Number) authentication system and some online cards may require such authentication for every transaction.

EFT (Electronic Funds Transfer) transactions may require communication between the parties to the transaction. The transaction may be authorized by parties participating in the transaction through an agreement. The limits of the transaction may be calculated based on the risk of authorizing a transaction, and may vary between merchants and card types.

An organization may allow transactions and value transfers to be made through the Internet. An electronic transaction may also serve as an electronic alternative to traditional paper methods of transactions such as checks and money orders. An organization may perform transaction processing for online vendors, auction sites, and other corporate or individual users. The organization may allow and encourage online shoppers to request cashback be deposited into their online account, e-wallet, or money market account while transacting with a debit card for goods or services acquired online.

In some example embodiments, retailers may require users to electronically sign an electronic cashback entry to confirm that they have received the cash benefit. As an example, an online acquirer may engage in a transaction at an online vendor website. The online acquirer may want to receive cashback when the transaction is made. When a debit card is used, the online transaction participant may have an ability to request a cashback amount (e.g., $20) in excess of the transaction total.

The cashback option may have several uses. One of the example uses may include a marketing mechanism that advertises the option of funding the account in the context of online vendor transactions. The user may be offered to open a money market account with the cashback value, or the value could be used to give the user an incentive to acquire other goods or services. The cashback method may be used in a variety of environments where a debit card funding mechanism is available with the cashback going to an account while abiding by all applicable laws and/or regulations.

In some example embodiments, a financial institution, or auction site may want to offer the user a service (e.g., insurance). The cashback option may enable funding the service transaction. Returning to FIG. 2, the transaction request receiving module 202 may be configured to receive a request to make a transaction for goods or services bought by the user from an online vendor. Upon receiving the request, the transaction request receiving module 202 may pass the received request to the processor authorization module 204 to get an authorization to make a transaction from the card issuer or their authorizing agent. As an example, a parent may wish to fund a child's account with cashback and authorize the cashback account to be transferred to another account. In yet another example the cashback amount may be allowed to fund the purchase of a prepaid or gift card.

The transaction authorization module 204 may be configured to request a pre-authorization or a complete authorization, as described in more detail below. Both modes of authorization may be used to provide the user with cashback options. In some example embodiments, the transaction authorization module 204 may request a pre-authorization for an amount exceeding the transaction amount in order to provide the user with a guaranteed option to fund their account with an amount that does not exceed the difference between the transaction price and the pre-authorized amount. A transaction in which the amount would exceed the difference between the transaction price and the pre-authorized amount would require a second authorization request.

In some example embodiments, the pre-authorization request is not made, and instead the user is given an option to select a cashback amount, which is added to the total goods or services being purchased, and the new total amount is submitted for authorization in a single message format also known as completion request message without a pre-authorization. Once the selection is made, the transaction authorization module 204 may make an authorization request to the processor 106. If the total transaction amount including the selected cashback amount is approved, the user's account is funded with the selected amount and receives their goods or services.

The cashback funding module 206 may be configured to fund the user account upon the transaction approval by the issuer or their agent. Various operations performed by the transaction processor 200, according to an example embodiment, are described by way of example with reference to FIG. 3 and FIG. 4.

Figure 3:
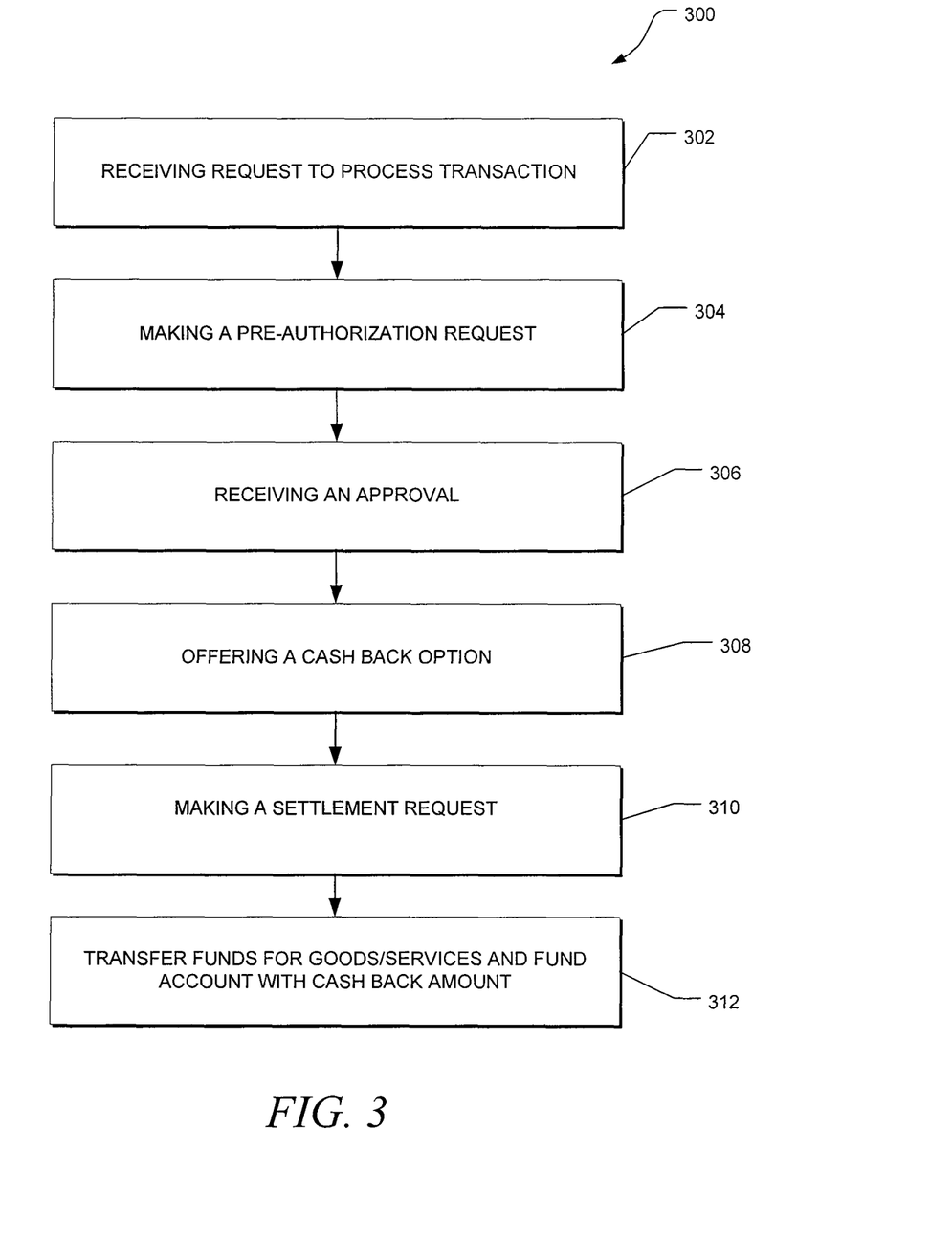
FIG. 3 is a flow diagram of a general overview of a method, in accordance with an example embodiment, for a cashback funding of an account including a pre-authorization step.

FIG. 3 is a flow diagram of a general overview of a method for a cashback funding of an account including pre-authorization, in accordance with an example embodiment. A method 300 may be performed by processing logic (e.g., dedicated logic, programmable logic, microcode, etc.) that may comprise hardware, software (such as that run on a general purpose computer system or a dedicated machine), or a combination of both. In one example embodiment, the method 300 may be performed by the various modules discussed above with reference to FIG. 2. Each of these modules may comprise processing logic.

As shown in FIG. 3, the method 300 commences at operation 302 with the transaction request receiving module receiving a request to process a transaction for a transaction made using an account. The transaction request receiving module may pass the information onto the transaction authorization module 204, and at operation 304, the transaction authorization module may make a pre-authorization request to the processor.

Accordingly, a transaction may be authorized via a pre-authorization operation where the merchant requests the processor to reserve an amount on the cardholder's account for a specific length of time. The pre-authorization may be followed by a completion message where the merchant requests the amount blocked earlier with a pre-authorization to be settled. This transaction may be used in various transaction environments such as on-line auctions, hotels and car rental establishments where the final amount is not known, and the pre-authorization is made based on an estimated amount.

At operation 306, the transaction authorization module 204 may send a pre-authorization request to the processor 106. In the context of a debit transaction, an online merchant may opt for a pinless debit transaction wherein the risk of a fraudulent transaction may transfer to the merchant. In some example embodiments, a dual message format may be used for an online debit transaction that would involve the pre-authorization and completion messages that may enable a transaction processing system. When users select their transaction processing account as the source of transaction, they may have a linked debit card capable of being routed via an EFT Network that enables the debit card to be used as a pinless transaction.

As an example, a user may want to settle a $55 acquisition of goods or services made online. The transaction processing system may route the transaction to the EFT network in the form of a pre-authorized transaction for $100. Thereafter, the EFT network may route the message to the issuer via their processor 106 for an approval. When the transaction is approved, the transaction processing system may return a screen message to the user who indicates that the $55 transaction is approved, and may prompt the user with the choice to deposit $45 into their online account for interest earnings, future transactions, or to maintain account balance. In some example embodiments, a suggestion may be made to deposit the $45 into a money market or other type of linked account or even as enticement to open a new account. If the authorization is denied by the issuer or their agent, the user may be shown the reasons for the denial. The reasons for the denial may include insufficient funds in the debit account to satisfy the transaction amount or the presence of a high risk in conducting a pinless transaction.

If the user agrees to a cashback transaction, the $45 is transferred to the user's selected or newly created account. If, on the contrary, the user does not agree to the cashback transaction, then the $55 transaction is completed. The completion message is routed to the EFT network to settle the user's transaction of $55 or $100, depending on the user's response.

At operation 308, the cashback funding module prompts the user to select a cashback option up to the maximum pre-authorized amount. If the user decides to proceed with the cashback option, the transaction authorization module may obtain full authorization for the exact amount from the processor and may proceed, at operation 312, to fund the user's account with the cash amount selected. As an example of a cashback transaction, a user may acquire $50 worth of widgets online and request $50 cashback. Thus the total transaction would settle as $100 and may appear on the user's bank statement as a $100 transaction. The $50 cashback would be used to fund the user's account and another $50 would be paid to settle the $50 widget acquisition.

In some example embodiments, the cashback transaction may not be processed by the transaction processor 200, but rather processed on a merchant's site. As an example, a user may want to acquire 50 erasers at $1 each. The merchant may allow the user to transact using the user's account. The user may log into his account through the merchant website in order to pay for 50 erasers at $1 each. The user's debit card may already be linked to the transaction processing account.

In some example embodiments, if it has not previously been done, the user may be given an option to link a debit card to the account upon a request for cashback. When a debit card is linked to the user's account, the user may be given an option to get cashback deposited into the user's account. A prompt message may be used informing the user about a cashback option. An example prompt may read "Did you know you could get cashback to fund your account free of charge?" One or more cashback amount options may also be provided (e.g., $20, $40, and $100).

The technology may not be limited to transaction systems and may be utilized in a variety of environments where there is an ability to perform cashback transactions via the Internet to fund a secondary source rather then to receive actual cash. Such implementation may include a dual message format, as described above with reference to pre-authorization and authorization messages. A single message format is described with reference to FIG. 4 below.

Figure 4:
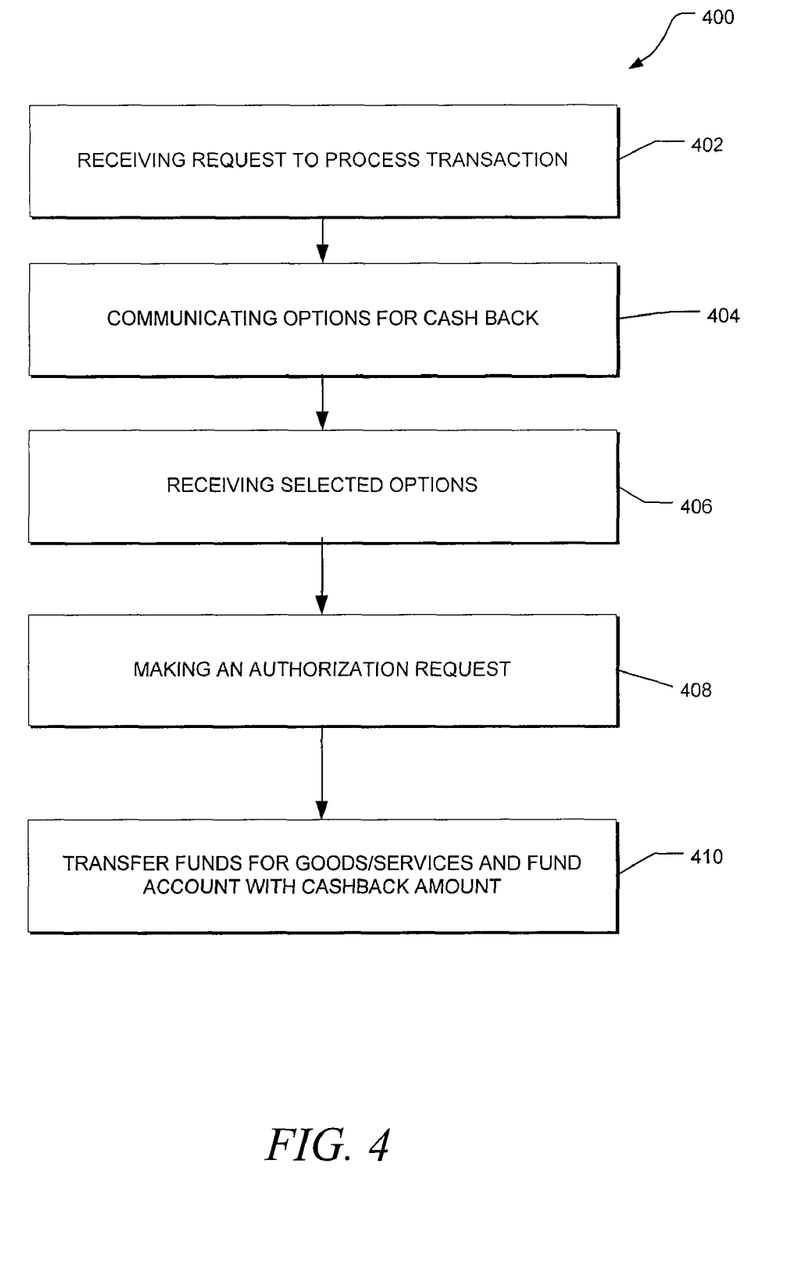
FIG. 4 is a flow diagram of a general overview of a method, in accordance with an example embodiment, for a cashback funding of an account including receiving user options before an authorization of the cashback funding.

FIG. 4 is a flow diagram of a general overview of a method for a cashback funding of an account, in accordance with an example embodiment, including receiving user options before an authorization. A method 400 may be performed by processing logic (e.g., dedicated logic, programmable logic, microcode, etc.) that may comprise hardware, software (such as that run on a general purpose computer system or a dedicated machine), PDA or mobile telephone or any one or more of these combinations. In one example embodiment, the method 400 may be performed by the various modules discussed above with reference to FIG. 2. Each of these modules may comprise processing logic.

As shown in FIG. 4, the method 400 commences at operation 402 with the transaction request receiving module receiving a request for transaction. In some example embodiments, the user may be asked before the transaction is completed to select how much they would like to fund their account above the transaction amount. Instead of utilizing the pre-authorization/completion method described above with reference to FIG. 3, a cashback transaction may be performed in a single transaction. This may involve asking the user whether he wants a cashback amount deposited into their account and if so, the amount he would like deposited.

Returning to FIG. 4, at operation 404, the cashback funding module 206 communicates cashback options to the user and, at operation 406; the cashback funding module receives the options selected by the user. At operation 408, the transaction authorization module 204 may make an authorization request to the processor 106, and at operation 410, the cashback funding module 206 funds the user's account with the selected cashback amount.

The user may be given an incentive to request cashback. As an example, the user may be offered the opportunity to open a money market account that earns interest. There may be other incentives offered, such as a cash match from the processing service, for example, 5 cents added to the transaction account for each $1 requested in a cashback transaction. In some example embodiments, the user would be given an incentive to be entered in a sweepstakes for a chance to win a valuable item or a cash prize. In some example embodiments, the user may be given a discount on future transactions that were paid for via cashback. In some example embodiments, the user may choose whether to use a debit card or a bank account routing number for a cashback transaction.

Whether the cashback amount is transferred from a debit card or a bank account, the transaction processing service may require disclosing the nature of the transaction. As an example, it may be reported to the processor 106 that $50 out of $100 total is a cashback amount. An acquisition of any negotiable item, such as a money order, prepaid or gift card, cash funding an account, or casino chip, may be considered a cashback transaction and may be required to be reported as such. In some example embodiments, the processing service may fund transaction processing accounts free of charge to the user or may charge a fee for the service. The amount credited to the account may be used by the user in the future to make transactions using the transaction processing account.

In some example embodiments, a user may want to fund his transaction processing account for various reasons. Accordingly, the user may request the cash when making a transaction. In some example embodiments, the transaction processing system may facilitate a pinless debit, which may require the transaction processing system to assume the risk in the transaction. The system may put a cap on the transaction up to a certain amount (e.g., $100) based on the certain risk models. The cap may be enforced against all users or be based on a particular risk category. As an example, no user may be given more than $200 cashback or the user may only get up to $100 unless the transaction processing account is verified or the user has had the account for some predetermined period (e.g., six months). In some example embodiments, the user may only be given certain cashback options of funding based on their risk profile.

Figure 5:
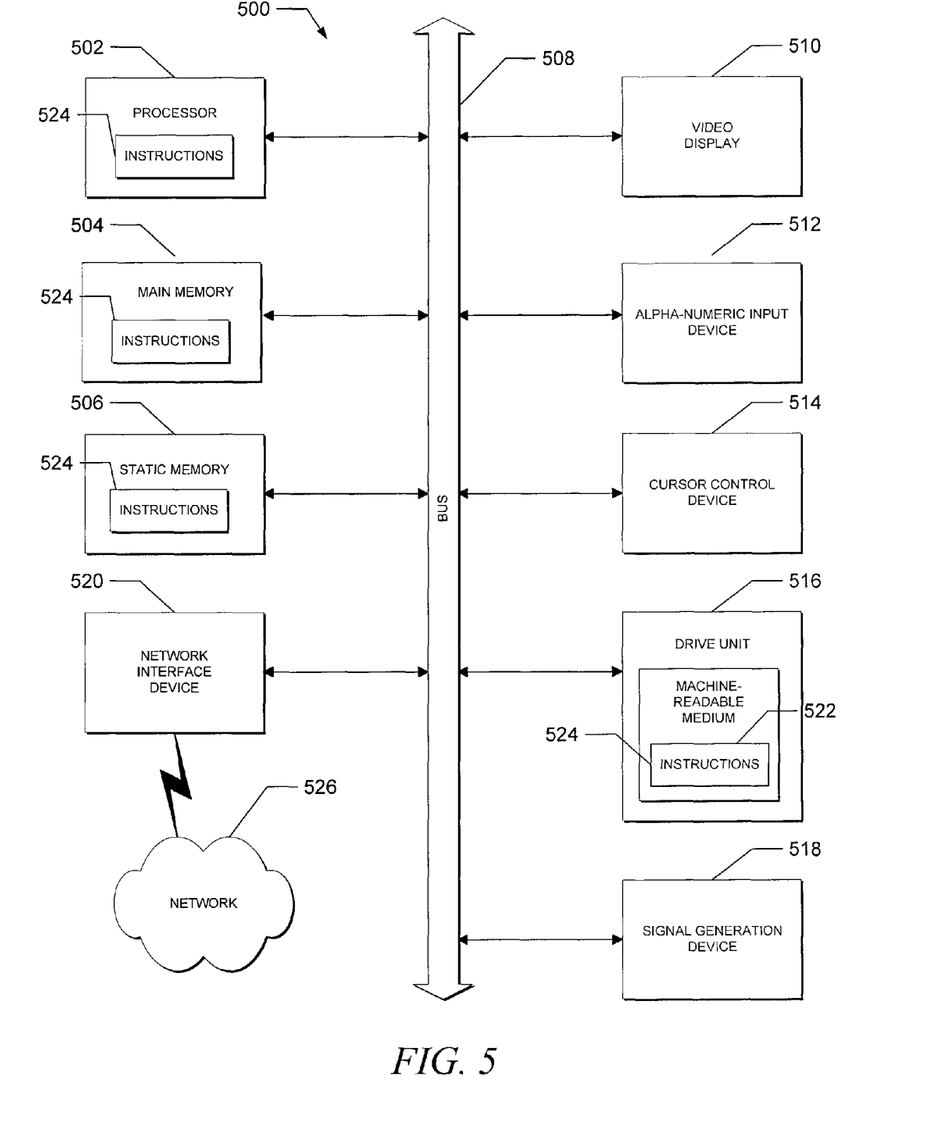
FIG. 5 is a diagrammatic representation of an example embodiment of a machine in the form of a computer system within which a set of instructions for causing the machine to perform any one or more of the methodologies discussed herein may be executed.

FIG. 5 shows a diagrammatic representation of an example embodiment of a machine in the example form of a computer system within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing a set of instructions, sequential or otherwise, that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 500 includes processor 502 (e.g., a central processing unit (CPU), a graphics processing unit (GPU) or both), main memory 504 and static memory 506, which communicate with each other via bus 508. Computer system 500 may further include video display unit 510 (e.g., a plasma display, a liquid crystal display (LCD) or a cathode ray tube (CRT)). Computer system 500 also includes alphanumeric input device 512 (e.g., a keyboard), cursor control device 514 (e.g., a mouse), disk drive unit 516, signal generation device 518 (e.g., a speaker) and network interface device 520.

Disk drive unit 516 includes machine-readable medium 522 on which is stored one or more sets of instructions and data structures (e.g., software 524) embodying or utilizing any one or more of the methodologies or functions described herein. Instructions 524 may also reside, completely or at least partially, within main memory 504 and/or within processor 502 during execution thereof by computer system 500, main memory 504, and processor 502 also constituting machine-readable media.

Software 524 may further be transmitted or received over network 526 via network interface device 520 utilizing any one of a number of well-known transfer protocols (e.g., HTTP).

While machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present application, or that is capable of storing, encoding, or carrying data structures utilized by or associated with such a set of instructions. The term "machine-readable medium" shall accordingly be taken to include, but not be limited to, solid-state memories, optical and magnetic media, and carrier wave signals.

Thus, a method and system for a cashback funding of an account have been described. Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
receiving, at a transaction processor, a request to process a transaction amount, the transaction amount being funded by a third party;
communicating a pre-authorization request to a third party processor associated with the third party, the pre-authorization request indicating a pre-authorization amount that exceeds the transaction amount by a predetermined amount;
receiving, from the third party processor, an approval for the pre-authorization request indicating the pre-authorization amount;
in response to the approval for the pre-authorization request, offering, using the transaction processor, a cashback amount having a value between zero and the predetermined amount at a user interface in communication with the third party processor, the pre-authorization request not including an indication of the transaction amount or the cashback amount;
receiving, at the transaction processor, an authorization request for an authorized amount having the value between the pre-authorized amount and the transaction amount, the authorized amount being a sum of the transaction amount and a selected cashback amount, an indication of the selected cashback amount received from the user in response to the offering of the cashback amount;
communicating, to the third party processor, the authorization request for the authorized amount; and funding an account with the selected cashback amount in response to an approval of the authorization request.

2. The computer-implemented method of claim 1, wherein the transaction amount is being funded by a debit card.

3. The computer-implemented method of claim 1, further comprising:
   determining if the approval for the pre-authorization request includes a reduced amount, the reduced amount being less than the pre-authorization amount and greater than the transaction amount; and
   wherein the cashback amount has a value between zero and the difference between the reduced amount and the transaction amount.

4. The computer-implemented method of claim 1, wherein the offering of the cashback amount further comprises displaying an amount option valued between zero and the predetermined amount.

5. A computer-implemented system comprising:
   a transaction request receiving module executable by a transaction processor to receive a request to process a transaction amount via a user interface, the transaction amount being funded by a third party;
   a transaction authorization module executable by the transaction processor to communicate a pre-authorization request to a third party processor associated with the third party, the pre-authorization request indicating a pre-authorization amount that exceeds the transaction amount by a predetermined amount; and
   a cashback funding module executable by the transaction processor to, in response to an approval of the pre-authorization request, offer a cashback amount having a value between zero and the predetermined amount at the user interface, the pre-authorization request not including an indication of the transaction amount or the cashback amount,
   the transaction request receiving module is further to receive an authorization request for an authorized amount having the value between the pre-authorized amount and the transaction amount, the authorized amount being a sum of the transaction amount and a selected cashback amount, an indication of the selected cashback amount received from the user in response to the offer of the cashback amount;
   the transaction authorization module is further to communicate the authorization request for the authorized amount; and
   the cashback funding module further to fund an account with the selected cashback amount in response to an approval of the authorization request.

6. The computer-implemented system of claim 5, wherein the cashback funding module is to fund an account with the cashback amount from a debit card.

7. The computer-implemented system of claim 5, wherein the transaction request receiving module is to determine if the approval for the pre-authorization request includes a reduced amount, the reduced amount being less than the pre-authorization amount and greater than the transaction amount and wherein the cashback amount has a value between zero and the difference between the reduced amount and the transaction amount.

8. A non-transitory computer-readable storage medium comprising instructions, which when implemented by one or more processors, perform the following operations comprising:
   receive a request to process a transaction amount, the transaction amount being funded by a third party;
   communicate a pre-authorization request to the third party, the pre-authorization request indicating a pre-authorization amount that exceeds the transaction amount by a predetermined amount;
   receive an approval for the pre-authorization request;
   in response to the approval for the pre-authorization request, offer a cashback amount having a value between zero and the predetermined amount, the pre-authorization request not including an indication of the transaction amount or the cashback amount;
   receiving an authorization request for an authorized amount having the value between the pre-authorized amount and the transaction amount, the authorized amount being a sum of the transaction amount and a selected cashback amount, an indication of the selected cashback amount received from the user in response to the offering of the cashback amount;
   communicating the authorization request for the authorized amount; and
   funding an account with the selected cashback amount in response to an approval of the authorization request.

* * * * *